US012574923B2

(12) United States Patent
Kiilerich Pratas et al.

(10) Patent No.: US 12,574,923 B2
(45) Date of Patent: Mar. 10, 2026

(54) OPTIMIZING SMALL DATA TRANSMISSION FOR A CLIENT DEVICE

(71) Applicant: Nokia Technologies Oy, Espoo (FI)

(72) Inventors: Nuno Manuel Kiilerich Pratas, Aalborg (DK); Daniela Laselva, Klarup (DK); Samuli Heikki Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 325 days.

(21) Appl. No.: 18/250,135

(22) PCT Filed: Oct. 22, 2020

(86) PCT No.: PCT/EP2020/079738
§ 371 (c)(1),
(2) Date: Apr. 21, 2023

(87) PCT Pub. No.: WO2022/083866
PCT Pub. Date: Apr. 28, 2022

(65) Prior Publication Data
US 2023/0403703 A1     Dec. 14, 2023

(51) Int. Cl.
*H04W 72/1268* (2023.01)
*H04W 88/06* (2009.01)

(52) U.S. Cl.
CPC ........ *H04W 72/1268* (2013.01); *H04W 88/06* (2013.01)

(58) Field of Classification Search
CPC ......... H04W 72/1268; H04W 74/0833; H04W 74/04; H04W 68/02; H04W 76/28; H04L 5/0048
See application file for complete search history.

(56) References Cited

U.S. PATENT DOCUMENTS

2020/0196349 A1     6/2020  He et al.
2022/0124780 A1*    4/2022  Lei ........................ H04L 5/0053
(Continued)

FOREIGN PATENT DOCUMENTS

WO      2020/186092 A2     9/2020
WO      2020/199794 A1     10/2020
(Continued)

OTHER PUBLICATIONS

"Work Item on NR smalldata transmissions in Inactive state", 3GPP TSG RAN Meeting #86, RP-193252, Agenda Item: 9.1.2, ZTE Corporation, Dec. 9-12, 2019, 4 pages.
(Continued)

*Primary Examiner* — Kathy W Wang-Hurst
*Assistant Examiner* — Garth D Richmond
(74) *Attorney, Agent, or Firm* — Lippes Mathias LLP

(57) ABSTRACT

Devices, methods and computer programs for optimizing small data transmission for a client device are disclosed. Configuration information for a small data transmission procedure is received at the client device from a network node device. The configuration information comprises set(s) of resources for a configured uplink scheduling grant for small data transmissions. The client device carries out one or more small data transmissions based on the received configuration information for the small data transmission procedure and/or subsequently received updated configuration information for the small data transmission procedure.

16 Claims, 5 Drawing Sheets

(56)                References Cited

U.S. PATENT DOCUMENTS

| | | | | |
|---|---|---|---|---|
| 2022/0159617 | A1* | 5/2022 | Shih | H04W 68/005 |
| 2023/0180223 | A1* | 6/2023 | Tseng | H04W 56/001 |
| | | | | 370/329 |
| 2023/0224771 | A1* | 7/2023 | Hong | H04W 60/005 |
| | | | | 455/436 |
| 2024/0340853 | A1* | 10/2024 | Park | H04L 5/0048 |

FOREIGN PATENT DOCUMENTS

| | | | |
|---|---|---|---|
| WO | 2021/060893 | A1 | 4/2021 |
| WO | 2021/111031 | A1 | 6/2021 |

OTHER PUBLICATIONS

"Revised SID: Study on system enablers for multi-SIM devices", TSG SA Meeting #SP-83, SP-190248, Agenda Item: 17B.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V1.0.0, Sep. 2020, pp. 1-104.

"New WID: Support for Multi-SIM devices in Rel-17", 3GPP TSG RAN Meeting #86, RP-193263, Agenda Item: 9.1.2, vivo, Dec. 9-12, 2019, 5 pages.

"3rd Generation Partnership Project; Technical Specification Group Services and System Aspects; Feasibility study on 5G message service for MIoT; Stage 1 (Release 16)", 3GPP TR 22.824, V16.0.0, Sep. 2018, pp. 1-27.

"3rd Generation Partnership Project; Technical Specification Group Radio Access Network; Study on New Radio Access Technology; Radio Interface Protocol Aspects (Release 14)", 3GPP TR 38.804 V14.0.0, Mar. 2017, pp. 1-57.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.1.0, Jul. 2020, pp. 1-141.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification GroupRadio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.2.0, Jul. 2020, pp. 1-390.

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"New SID on support of reduced capability NR devices", 3GPP TSG RAN Meeting #86, RP-193238, Agenda Item: 9.1.1, Ericsson, Dec. 9-12, 2019, 5 pages.

International Search Report and Written Opinion received for corresponding Patent Cooperation Treaty Application No. PCT/EP2020/079738, dated Jul. 9, 2021, 16 pages.

"Overview of Rel-17 work areas for NR and LTE", 3GPP TSG RAN Meeting #84, RP-191007, Agenda item: 8, Huawei, Jun. 3-6, 2019, 22 pages.

Notice of Allowance received for corresponding European Patent Application No. 20797433.8, dated Apr. 18, 2024, 8 pages.

* cited by examiner

100

200

210

UE

| USIM 1 | | USIM 2 | 〜210

200〜 | gNB |

RRC Idle / Inactive     RRC Connected

Paging Occasion

301A. The USIM 2 is aware of the MUSIM gaps

302A. Request for CG-SDT Config (including preferences excluding MUSIM gaps)

303A. RRC Release w/Suspend Config containing CG-SDT Config according to UE preferences RRC Inactive Paging Occasion CG-SDT resource     304A. CG-SDT transmission occurs in the indicated resources Paging Occasion CG-SDT resource     305A. CG-SDT transmission occurs in the indicated resources

USIM 1       USIM 2    ～210

200 ～   gNB

RRC Idle / Inactive

RRC Connected

Paging Occasion

301B. The USIM 2 is aware of the MUSIM gaps

302B. CG-SDT Configuration Indication

303B. The USIM 2 indicates to the network the prefered configuration

304B. RRC Release w/Suspend Config containing CG-SDT Config according to UE preferences RRC Inactive Paging Occasion CG-SDT resource     305B. CG-SDT transmission occurs in the indicated resources Paging Occasion CG-SDT resource     306B. CG-SDT transmission occurs in the indicated resources

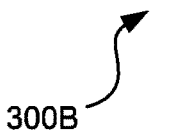

OPTIMIZING SMALL DATA TRANSMISSION FOR A CLIENT DEVICE

RELATED APPLICATION

This application was originally filed as PCT Application No. PCT/EP2020/079738, filed on Oct. 22, 2020, of which is incorporated herein by reference in its entirety.

TECHNICAL FIELD

The disclosure relates generally to communications and, more particularly but not exclusively, to optimizing small data transmission for a client device.

BACKGROUND

In cellular communication networks, a user equipment (UE) may have multiple subscriber identity modules (SIMs) that may operate independent of each other, such that e.g. one SIM is in a connected state while another SIM is in a non-connected state but still performing e.g. paging monitoring activities.

Fifth generation (5G) new radio (NR) wireless networks allow so called small data transmissions (SDTs) to convey packet data transmissions while a client device is in RRC Inactive state.

However, having multiple SIMs in a UE may in-troduce disruptions to the SDTs.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises at least one processor and at least one memory including computer program code. The at least one memory and the computer program code are configured to, with the at least one processor, cause the network node device to at least perform:

generating configuration information for a small data transmission procedure of a client device, the configuration information for the small data transmission procedure comprising at least one set of resources for a configured uplink scheduling grant for small data transmissions, wherein the configuration information is generated based on unavailability information regarding the client device, the unavailability information being about at least one unavailability time period; and transmitting the generated configuration information to the client device.

In an example embodiment, alternatively or in addition to the above-described example embodiments, the at least one unavailability time period is due to an overlapping activity of the client device.

In an example embodiment, alternatively or in addition to the above-described example embodiments, the at least one memory and the computer program code are further configured to, with the at least one processor, cause the network node device to at least perform:

after transmitting the generated configuration information to the client device, receiving from the client device an update request for the configuration information based on a detected overlap in the transmitted configuration information with an overlapping activity of the client device;

generating updated configuration information for the small data transmission procedure based on the received update request for the configuration information; and transmitting the generated updated configuration information to the client device.

In an example embodiment, alternatively or in addition to the above-described example embodiments, the transmitted configuration information comprises at least two sets of the resources for the configured uplink scheduling grant and the received update request for the configuration information comprises a selection indication about a selected non-overlapping one of the transmitted at least two sets of the resources for the configured uplink scheduling grant, and the at least one memory and the computer program code are further configured to, with the at least one processor, cause the network node device to perform the generating of the updated configuration information for the small data transmission procedure based on the selected non-overlapping one of the transmitted at least two sets of the resources for the configured uplink scheduling grant.

In an example embodiment, alternatively or in addition to the above-described example embodiments, the client device further comprises a first subscriber identity module and a second subscriber identity module; and the at least one memory and the computer program code are further configured to, with the at least one processor, cause the network node device to at least perform the generating of the configuration information for small data transmissions for the second subscriber identity module.

In an example embodiment, alternatively or in addition to the above-described example embodiments, the overlapping activity is due to one or more operations related to at least one of the first subscriber identity module or the second subscriber identity module.

In an example embodiment, alternatively or in addition to the above-described example embodiments, the overlapping activity comprises a paging monitoring activity related to at least one of the first subscriber identity module and the second subscriber identity module.

In an example embodiment, alternatively or in addition to the above-described example embodiments, the unavailability information is received from the client device as part of a request for the configuration information for the small data transmission procedure.

An example embodiment of a network node device comprises means for performing:

generating configuration information for a small data transmission procedure of a client device, the configuration information for the small data transmission procedure comprising at least one set of resources for a configured uplink scheduling grant for small data transmissions, wherein the configuration information is generated based on unavailability information regarding the client device, the unavailability information being about at least one unavailability time period; and transmitting the generated configuration information to the client device.

In an example embodiment, alternatively or in addition to the above-described example embodiments, the client device further comprises a first subscriber identity module and a second subscriber identity module; and the means are further configured to perform the generating of the configuration information for small data transmissions for the second subscriber identity module.

An example embodiment of a method comprises:

generating, by a network node device, configuration information for a small data transmission procedure of a client device, the configuration information for the small data transmission procedure comprising at least one set of resources for a configured uplink scheduling grant for small data transmissions, wherein the configuration information is generated based on unavailability information regardingthe client device, the unavailability information being about at least one unavailability time period; and transmitting the generated configuration information from the network node device to the client device.

In an example embodiment, alternatively or in addition to the above-described example embodiments, the at least one unavailability time period is due to an overlapping activity of the client device.

In an example embodiment, alternatively or in addition to the above-described example embodiments, the method further comprises:

after transmitting the generated configuration information to the client device, receiving at the network node device from the client device an update request for the configuration information based on a detected overlap in the transmitted configuration information with an overlapping activity of the client device;

generating, by the network node device, updated configuration information for the small data transmission procedure based on the received update request for the configuration information; and transmitting the generated updated configuration information from the network node device to the client device.

In an example embodiment, alternatively or in addition to the above-described example embodiments, the transmitted configuration information comprises at least two sets of the resources for the configured uplink scheduling grant and the received update request for the configuration information comprises a selection indication about a selected non-overlapping one of the transmitted at least two sets of the resources for the configured uplink scheduling grant, and the generating of the updated configuration information for the small data transmission procedure is performed based on the selected non-overlapping one of the transmitted at least two sets of the resources for the configured uplink scheduling grant.

In an example embodiment, alternatively or in addition to the above-described example embodiments, the client device further comprises a first subscriber identity module and a second subscriber identity module; and the generating of the configuration information comprises generating the configuration information for small data transmissions for the second subscriber identity module.

In an example embodiment, alternatively or in addition to the above-described example embodiments, the overlapping activity is due to one or more operations related to at least one of the first subscriber identity module or the second subscriber identity module.

In an example embodiment, alternatively or in addition to the above-described example embodiments, the overlapping activity comprises a paging monitoring activity related to at least one of the first subscriber identity module and the second subscriber identity module.

In an example embodiment, alternatively or in addition to the above-described example embodiments, the unavailability information is received from the client device as part of a request for the configuration information for the small data transmission procedure.

An example embodiment of a computer program comprises instructions for causing a network node device to perform at least the following:

generating configuration information for a small data transmission procedure of a client device, the configuration information for the small data transmission procedure comprising at least one set of resources for a configured uplink scheduling grant for small data transmissions, wherein the configuration information is generated based on unavailability information regarding the client device, the unavailability information being about at least one unavailability time period; and transmitting the generated configuration information to the client device.

In an example embodiment, alternatively or in addition to the above-described example embodiments, the client device further comprises a first subscriber identity module and a second subscriber identity module; and the generating of the configuration information comprises generating the configuration information for small data transmissions for the second subscriber identity module.

An example embodiment of a client device comprises at least one processor, and at least one memory including computer program code. The at least one memory and the computer program code are configured to, with the at least one processor, cause the client device to at least perform:

receiving, from a network node device, configuration information for a small data transmission procedure, the configuration information for the small data transmission procedure comprising at least one set of resources for a configured uplink scheduling grant for small data transmissions, the configuration information generated based on unavailability information received from the client device, the unavailability information being about at least one unavailability time period; and carrying out one or more small data transmissions based on at least one of the received configuration information for the small data transmission procedure or subsequently received updated configuration information for the small data transmission procedure.

In an example embodiment, alternatively or in addition to the above-described example embodiments, the client device further comprises a first subscriber identity module and a second subscriber identity module.

In an example embodiment, alternatively or in addition to the above-described example embodiments, the configuration information for the small data transmission procedure is received when the first subscriber identity module is not in a connected state of radio resource control, RRC.

In an example embodiment, alternatively or in addition to the above-described example embodiments, the first subscriber identity module not being in the connected state of RRC comprises the first subscriber identity module being in an idle state of RRC or in an inactive state of RRC.

In an example embodiment, alternatively or in addition to the above-described example embodiments, the at least one memory and the computer program code are further configured to, with the at least one processor, cause the client device to at least perform:

prior to or after receiving the configuration information, transmitting to the network node device the unavailability information about the at least one unavailability time period.

In an example embodiment, alternatively or in addition to the above-described example embodiments, the at least one unavailability time period is due to an overlapping activity of the client device.

In an example embodiment, alternatively or in addition to the above-described example embodiments, the at least one memory and the computer program code are further configured to, with the at least one processor, cause the client device to at least perform:

detecting an overlap in the received configuration information with an overlapping activity of the client device, before carrying out the one or more small data transmissions;

transmitting to the network node device an update request for the configuration information based on the detected overlap; and receiving, from the network node device, updated configuration information for the small data transmission procedure.

In an example embodiment, alternatively or in addition to the above-described example embodiments, the received configuration information comprises at least two sets of the resources for the configured uplink scheduling grant, and the at least one memory and the computer program code are further configured to, with the at least one processor, cause the client device to at least perform:

in response to detecting the overlap in the received configuration information, selecting a non-overlapping one of the received at least two sets of the resources for the configured uplink scheduling grant, and the transmitted update request for the configuration information comprises a selection indication about the selected non-overlapping one of the received at least two sets of the resources for the configured uplink scheduling grant.

In an example embodiment, alternatively or in addition to the above-described example embodiments, the at least one memory and the computer program code are further configured to, with the at least one processor, cause the client device to at least perform:

detecting an overlap in the received configuration information with an overlapping activity of the client device, after carrying out at least one of the one or more small data transmissions;

transmitting to the network node device an update request for the configuration information based on the detected overlap; and receiving, from the network node device, updated configuration information for the small data transmission procedure.

In an example embodiment, alternatively or in addition to the above-described example embodiments, the first subscriber identity module not being in the connected state of RRC further comprises the first subscriber identity module being deactivated when first receiving the configuration information.

In an example embodiment, alternatively or in addition to the above-described example embodiments, the overlapping activity comprises a paging monitoring activity related to at least one of the first subscriber identity module and the second subscriber identity module.

An example embodiment of a client device comprises means for performing:

receiving, from a network node device, configuration information for a small data transmission procedure, the configuration information for the small data transmission procedure comprising at least one set of resources for a configured uplink scheduling grant for small data transmissions, the configuration information generated based on unavailability information received from the client device, the unavailability information being about at least one unavailability time period; and carrying out one or more small data transmissions based on at least one of the received configuration information for the small data transmission procedure or subsequently received updated configuration information for the small data transmission procedure.

In an example embodiment, alternatively or in addition to the above-described example embodiments, the client device further comprises a first subscriber identity module and a second subscriber identity module.

An example embodiment of a method comprises:

receiving at the client device from a network node device, configuration information for a small data transmission procedure, the configuration information for the small data transmission procedure comprising at least one set of resources for a configured uplink scheduling grant for small data transmissions, the configuration information generated based on unavailability information received from the client device, the unavailability information being about at least one unavailability time period; and carrying out, by the client device, one or more small data transmissions based on at least one of the received configuration information for the small data transmission procedure or subsequently received updated configuration information for the small data transmission procedure.

In an example embodiment, alternatively or in addition to the above-described example embodiments, the client device further comprises a first subscriber identity module and a second subscriber identity module.

In an example embodiment, alternatively or in addition to the above-described example embodiments, the configuration information for the small data transmission procedure is received when the first subscriber identity module is not in a connected state of radio resource control, RRC.

In an example embodiment, alternatively or in addition to the above-described example embodiments, the first subscriber identity module not being in the connected state of RRC comprises the first subscriber identity module being in an idle state of RRC or in an inactive state of RRC.

In an example embodiment, alternatively or in addition to the above-described example embodiments, the method further comprises:

prior to or after receiving the configuration information, transmitting from the client device to the network node device the unavailability information about the at least one unavailability time period.

In an example embodiment, alternatively or in addition to the above-described example embodiments, the at least one unavailability time period is due to an overlapping activity of the client device.

In an example embodiment, alternatively or in addition to the above-described example embodiments, the method further comprises:

detecting, by the client device, an overlap in the received configuration information with an overlapping activity of the client device, before carrying out the one or more small data transmissions;

transmitting from the client device to the network node device an update request for the configuration information based on the detected overlap; and receiving, at the client device from the network node device, updated configuration information for the small data transmission procedure.

In an example embodiment, alternatively or in addition to the above-described example embodiments, the received configuration information comprises at least two sets of the resources for the configured uplink scheduling grant, and the method further comprises:

in response to detecting the overlap in the received configuration information, selecting, by the client device, a non-overlapping one of the received at least two sets of the resources for the configured uplink scheduling grant, and the transmitted update request for the configuration information comprises a selection indication about the selected non-overlapping one of the received at least two sets of the resources for the configured uplink scheduling grant.

In an example embodiment, alternatively or in addition to the above-described example embodiments, the method further comprises:

detecting, by the client device, an overlap in the received configuration information with an overlapping activity of the client device, after carrying out at least one of the one or more small data transmissions;

transmitting from the client device to the network node device an update request for the configuration information based on the detected overlap; and receiving, at the client device from the network node device, updated configuration information for the small data transmission procedure.

In an example embodiment, alternatively or in addition to the above-described example embodiments, the first subscriber identity module not being in the connected state of RRC further comprises the first subscriber identity module being deactivated when first receiving the configuration information.

In an example embodiment, alternatively or in addition to the above-described example embodiments, the overlapping activity comprises a paging monitoring activity related to at least one of the first subscriber identity module and the second subscriber identity module.

In an example embodiment, alternatively or in addition to the above-described example embodiments, the client device further comprises a first subscriber identity module and a second subscriber identity module.

An example embodiment of a computer program comprises instructions for causing a client device to perform at least the following:

receiving, from a network node device, configuration information for a small data transmission procedure, the configuration information for the small data transmission procedure comprising at least one set of resources for a configured uplink scheduling grant for small data transmissions, the configuration information generated based on unavailability information received from the client device, the unavailability information being about at least one unavailability time period; and carrying out one or more small data transmissions based on at least one of the received configuration information for the small data transmission procedure or subsequently received updated configuration information for the small data transmission procedure.

In an example embodiment, alternatively or in addition to the above-described example embodiments, the client device further comprises a first subscriber identity module and a second subscriber identity module.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings:

FIG. 3A shows an example embodiment of the subject matter described herein illustrating a method;

FIG. 3B shows an example embodiment of the subject matter described herein illustrating another method.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
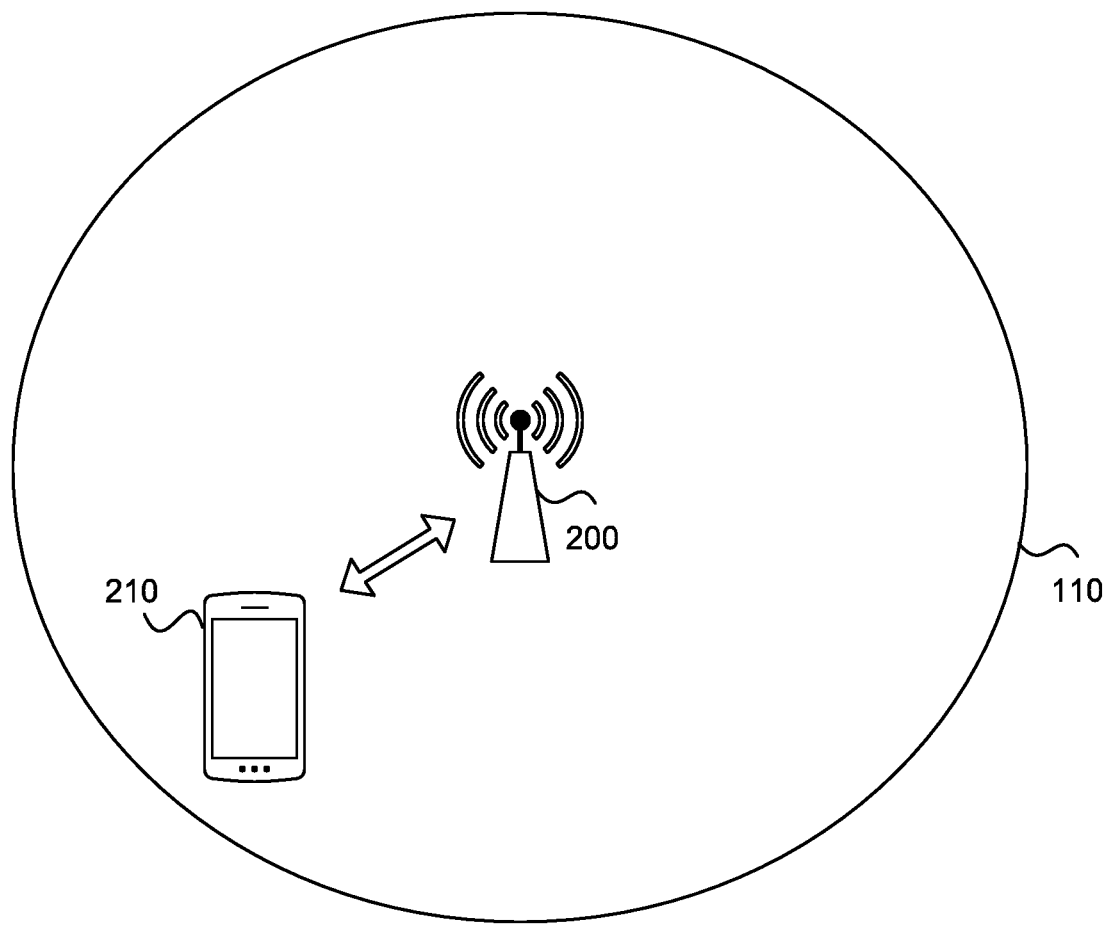
FIG. 1 shows an example embodiment of the subject matter described herein illustrating an example system, where various embodiments of the present disclosure may be implemented.
Figure 1:
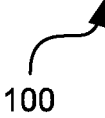

FIG. 1 illustrates an example system 100, where various embodiments of the present disclosure may be implemented. The system 100 may comprise a fifth generation (5G) new radio (NR) network 110. An example representation of the system 100 is shown depicting a network node device 200 and a client device 210. At least in some embodiments, the 5G NR network 110 may comprise one or more massive machine-to-machine (M2M) network(s), massive machine type communications (mMTC) network(s), internet of things (IoT) network(s), industrial internet-of-things (IIoT) network(s), enhanced mobile broad-band (eMBB) network(s), ultra-reliable low-latency com-munication (URLLC) network(s), and/or the like.

The client device 210 may include e.g. a mobile phone, a smartphone, a tablet computer, a smart watch, or any handheld or portable device. The client device 210 may also be referred to as a user equipment (UE). The network node device 200 may be a base station. The base station may include e.g. a fifth-generation base station (gNB) or any such device suitable for providing an air interface for client devices to connect to a wireless network via wireless transmissions.

In the following, various example embodiments will be discussed. At least some of these example embodiments may allow optimizing small data transmission for a client device having multiple subscriber identity modules.

Figure 2A:
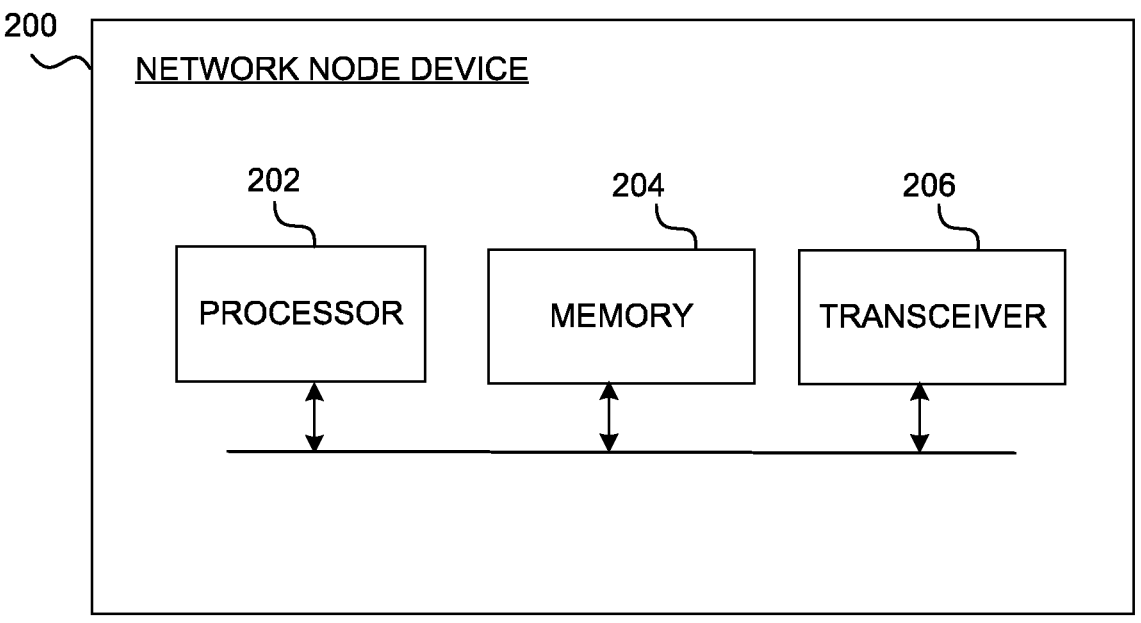
FIG. 2A shows an example embodiment of the subject matter described herein illustrating a network node device.
Figure 2B:
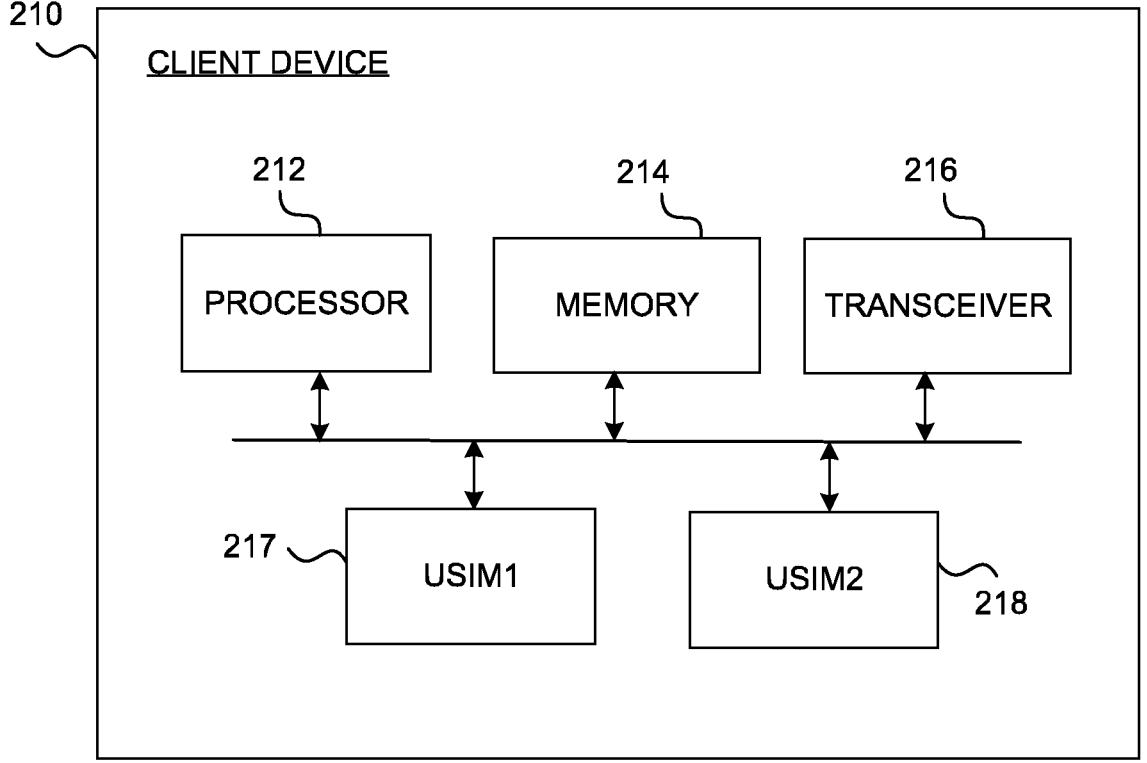
FIG. 2B shows an example embodiment of the subject matter described herein illustrating a client device.

FIG. 2B is a block diagram of the client device 210, in accordance with an example embodiment.

The client device 210 comprises one or more processors 212 and one or more memories 214 that comprise computer program code. The client device 210 may further comprise a first subscriber identity module 217 and a second subscriber identity module 218. The client device 210 may also include other elements, such as a transceiver 216, as well as other elements not shown in FIG. 2B. The client device 210 may comprise more than two subscriber identity modules.

Although the client device 210 is depicted to include only one processor 212, the client device 210 may include more processors. In an embodiment, the memory 214 is capable of storing instructions, such as an operating system and/or various applications. Furthermore, the memory 214 may include a storage that may be used to store e.g. at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The first subscriber identity module 217 may comprise a universal subscriber identity module (USIM). Similarly, the second subscriber identity module 218 may comprise a universal subscriber identity module (USIM). A client device having two or more universal subscriber identity modules is referred to as a multi-USIM (MUSIM) device.

A first type of MUSIM devices comprises dual SIM dual standby (DSDS) or multi USIM multi standby (MUMS) devices which may be registered with two or more independent subscriber identities (IDs) (i.e. USIMs) and which can be in RRC_IDLE mode on all USIMs. However, this type of device can only be on RRC_CONNECTED mode with a single USIM at a given time. A second type of MUSIM devices comprises dual SIM dual active (DSDA) or multi USIM multi active (MUMA) devices which may be registered with two or more independent subscriber IDs (i.e. USIMs) and can be in RRC_IDLE mode on all USIMs. This second type of MUSIM device can maintain RRC_CONNECTED mode activities on all USIMs.

The client device 210 may be any of various types of devices used directly by an end user entity and capable of communication in a wireless network, such as user equipment (UE). Such devices include but are not limited to smartphones, tablet computers, smart watches, lap top computers, internet-of-things (IoT) devices, massive machine-to-machine (M2M) devices, massive machine type communications (mMTC) devices, industrial internet-of-things (IIoT) devices, enhanced mobile broadband (eMBB) devices, ultra-reliable low-latency communication (URLLC) devices, etc.

The at least one memory 214 and the computer program code are configured to, with the at least one processor 212, cause the client device 210 to at least perform receiving, from the network node device 200, configuration information for a small data transmission (SDT) procedure. In at least some embodiments, the configuration information for the small data transmission procedure may be received when the first subscriber identity module 217 is not in a connected state of radio resource control (RRC) and/or the second subscriber identity module 218 is in a connected state of RRC. The configuration information has been generated by the network node device 200 based on unavailability information regarding (and at least in some embodiments received from) the client device 210, the unavailability information being about at least one unavailability time period. For example, the unavailability information may be received from the client device 210 as part of a request for the configuration information for the small data transmission procedure.

For example, the first subscriber identity module 217 not being in the connected state of RRC may comprise the first subscriber identity module 217 being in an idle state of RRC or in an inactive state of RRC.

For example, the inactive state of RRC may comprise RRC INACTIVE state of 5G NR, the idle state of RRC may comprise RRC_IDLE state of 5G NR, and the connected state of RRC may comprise RRC_CONNECTED state of 5G NR. The RRC INACTIVE state of 5G NR is designed to complement the existing states, RRC_CONNECTED and RRC_IDLE, with the goal of lean signaling and energy-efficient support of NR services. The RRC INACTIVE state allows to more quickly resume the connection and start the transmission of small or sporadic data with a much lower initial access delay and associated signaling overhead as compared to the RRC_IDLE state. This is achieved e.g. thanks to reduced control signaling required for requesting and obtaining the resume of a suspended RRC connection, which results in UE power saving. At the same time, a UE in RRC INACTIVE is able to achieve similar power savings as in RRC_IDLE, benefiting from e.g. a much larger period of physical downlink control channel (PDCCH) monitoring (e.g. paging) and relaxed measurements compared to RRC_CONNECTED.

Small data transmissions (SDTs) may be used in NR wireless networks to convey packet data transmissions while a client device is in RRC Inactive state. An SDT can be used during RRC INACTIVE state without need for a state transition to RRC_CONNECTED state.

The configuration information for the small data transmission procedure comprises at least one set of resources for a configured uplink scheduling grant for small data transmissions (e.g. for the second subscriber identity module 218). For example, the configured uplink scheduling grant may comprise a configure grant (CG) for physical uplink shared channel (PUSCH) resources. This enables transmitting uplink (UL) data on preconfigured PUSCH resources since configured grant-based resources of type 1 can be used by the client device 210 to transmit the SDT payload when it has a valid timing advance (TA) value. Herein, this transmission of the SDT payload via grant-based resources of type 1 is referred to as CG-SDT.

The at least one memory 214 and the computer program code are further configured to, with the at least one processor 212, cause the client device 210 to at least perform carrying out one or more small data transmissions (e.g. for the second subscriber identity module 218) based on at least one of the received configuration information for the small data transmission procedure, or based on subsequently received updated configuration information for the small data transmission procedure.

In at least some embodiments, the at least one memory 214 and the computer program code may further be configured to, with the at least one processor 212, cause the client device 210 to at least perform transmitting to the network node device 200 the unavailability information about the at least one unavailability time period. The at least one unavailability time period may be due to an overlapping activity of the client device 210. In at least some embodiments, the overlapping activity may be that of the first subscriber identity module 217, and/or the unavailability time period may be that of the second subscriber identity module 218.

In other words, at least some variations of the above embodiment may represent a first use case (further illustrated in FIG. 3A and its description below) in which the USIM is aware of the MUSIM gaps, and upon requesting the CG-SDT resources it indicates in which time periods it will be unavailable.

In at least some embodiments, the overlapping activity (e.g. of the first subscriber identity module 217) may comprise a paging monitoring activity related to the first subscriber identity module 217 and/or the second subscriber identity module 218.

In at least some embodiments, the at least one memory 214 and the computer program code may alternatively be configured to, with the at least one processor 212, cause the client device 210 to at least perform detecting an overlap in the received configuration information with an overlapping activity of the client device 210, before carrying out the one or more small data transmissions. In at least some embodiments, the overlap may be with an activity of the first subscriber identity module 217 based on unavailability information about at least one unavailability time period of the second subscriber identity module 218 that is caused by an overlapping activity of the first subscriber identity module 217. The at least one memory 214 and the computer program code may further be configured to, with the at least one processor 212, cause the client device 210 to at least perform transmitting to the network node device 200 an update request for the configuration information based on the detected overlap. The at least one memory 214 and the computer program code may further be configured to, with the at least one processor 212, cause the client device 210 to at least perform receiving, from the network node device 200, updated configuration information for the small data transmission procedure.

In at least some embodiments, the received configuration information may comprise at least two sets of the resources for the configured uplink scheduling grant, and the at least one memory 214 and the computer program code may further be configured to, with the at least one processor 212, cause the client device 210 to at least perform selecting a non-overlapping one of the received at least two sets of the resources for the configured uplink scheduling grant in response to detecting the overlap in the received configuration information. The transmitted update request for the configuration information may comprise a selection indication about the selected non-overlapping one of the received at least two sets of the resources for the configured uplink scheduling grant.

In other words, at least some variations of the above embodiments may represent a second use case (further illustrated in FIG. 3B and its description below) in which the USIM is aware of the MUSIM gaps and receives the CG-SDT configuration from the network node device 200.

In a first variation of the second use case, the CG-SDT configuration includes one set of resources (having e.g. one start/offset to reference system frame number (SFN) and one periodicity). In a case in which the configured resources overlap with the MUSIM gaps, the client device 210 may indicate this to the network node device 200 and the network node device 200 informs of a new configuration.

In a second variation of the second use case, the CG-SDT configuration may include multiple sets of resources/CGs (each with a respective start/offset to reference SFN and same or different periodicities). The client device 210 may select the set of resources that avoids overlaps and inform the network node device 200 about which CG it will use.

In an embodiment of the second use case, the CG-SDT configuration (for which the contents follow the first or second variation) may be given to the client device 210 e.g. via an RRC Reconfiguration-message. The client device 210 may then provide feedback to the network node device 200 utilizing e.g. an RRC Reconfiguration complete-message.

The second use case may be applicable to CG operations in RRC Connected state. In this case, as an alternative to the second variation, the client device 210 may provide the CG index it will use out of the multiple CGs via a medium access control (MAC) control element (CE).

In at least some embodiments, the first subscriber identity module 217 not being in the connected state of RRC may further comprise the first subscriber identity module 217 being deactivated when first receiving the configuration information. The at least one memory 214 and the computer program code may alternatively be configured to, with the at least one processor 212, cause the client device 210 to at least perform detecting an overlap in the received configuration information with an overlapping activity of the client device 210, after carrying out at least one of the one or more small data transmissions. In at least some embodiments, this may comprise detecting an overlap in the received configuration information with an activity of the first subscriber identity module 217 based on unavailability information about at least one unavailability time period of the second subscriber identity module 218 due to an overlapping activity of the first subscriber identity module 217, in response to the first subscriber identity module 217 being activated into an idle state of RRC or an inactive state of RRC after receiving the configuration information. The at least one memory 214 and the computer program code may further be configured to, with the at least one processor 212, cause the client device 210 to at least perform transmitting to the network node device 200 an update request for the configuration information based on the detected overlap. The at least one memory 214 and the computer program code may further be configured to, with the at least one processor 212, cause the client device 210 to at least perform receiving from the network node device 200 updated configuration information for the small data transmission procedure.

In other words, at least some variations of the above embodiment may represent a third use case (further illustrated in FIG. 3C and its description below) in which the USIM is not aware of the MUSIM gaps (e.g. the other USIM(s) are deactivated) and receives the CG-SDT configuration from the network node device 200. At least another USIM is activated afterwards and the associated MUSIM gaps collide partially or completely with the configured CG-SDT resources.

In a first variation of the third use case, the client device 210 may initiate a procedure for an update of the CG-SDT resource configuration to avoid the col-lision (e.g. a random access channel (RACH) procedure, a RAN (radio access network) notification area (RNA) update, or a RACH SDT), and indicate to the network node device 200 (via resources not being overlapped with the MUSIM gaps) that the client device 210 requires the CG-SDT configuration to be updated in order to avoid these collisions with the MUSIM gaps. Here, the request may be e.g. in the form of an RRC Resume Request with a new cause and an accompanying MAC CE payload indicating preferences of the client device 210;

In a second variation of the third use case, the client device 210 may initiate an RRC Resume procedure upon data arrival on a SDT-DRB after the CG-SDT occasion overlaps with MUSIM gap(s). Additionally, this may trigger the client device 210 to transmit information to the network node device 200 about the preferred SDT configuration (e.g. taking into account the MUSIM gaps). Here, the client device 210 may suspend or release the CG-SDT configuration upon overlap with MUSIM gap(s).

In a third variation of the third use case, the client device 210 may suspend or release the CG-SDT configuration when another USIM is activated in the client device 210. Upon data arrival, RRC Resume procedure may be initiated and information may be transmitted to the network node device 200 about the preferred SDT configuration.

Accordingly, at least some embodiments of the present disclosure may provide a mechanism that allows the client device 210, upon detecting that there is a possibility of an overlap in time between a CG operation associated with one USIM and the MUSIM activities associated with another USIM, to request the network node device 200 to adjust the CG-SDT configuration to remove the overlap between CG-SDT and MUSIM activities.

Various signaling procedures are disclosed to remove this overlap. The signaling procedures may be applicable depending on the status of the client device 210 USIMs.

As discussed above, a distinction has been made between cases where the USIM upon being configured with CG-SDT is already aware of the potential overlapping with the MUSIM operations (i.e. the duration and time instances of the MUSIM induced gaps are known) and where the USIM only becomes aware of the MUSIM gap after it has already received the CG-SDT operation (and is po-tentially already transitioned to RRC INACTIVE). It is to be noted that even though the signaling procedures have been described considering the CG-SDT operations for the RRC INACTIVE state for simplicity, at least some of the disclosed signaling details may be valid also for CG operations for the RRC_CONNECTED mode (herein referred to as CG-Connected). This means that CG-SDT/CG-Connected may be used instead of "CG-SDT" herein.

FIG. 2A is a block diagram of a network node device 200, in accordance with an example embodiment.

The network node device 200 comprises at least one processor 202 and at least one memory 204 including computer program code. The network node device 200 may also include other elements, such as a transceiver 206.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store e.g. at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The network node device 200 may be a base station. The base station may include e.g. a fifth-generation base station (gNB) or any such device providing an air interface for client devices to connect to the wireless network via wireless transmissions.

The at least one memory 204 and the computer program code are configured to, with the at least one processor 202, cause the network node device 200 to at least perform generating configuration information for a small data transmission procedure of the client device 210. As discussed above, the configuration information for the small data transmission procedure comprises at least one set of resources for a configured uplink scheduling grant for small data transmissions (e.g. for the second subscriber identity module 218). The configuration information is generated based on unavailability information regarding (and at least in some embodiments received from) the client device 210, the unavailability information being about at least one unavailability time period, as discussed above in more detail. As previously described, the unavailability information may be e.g. received from the client device 210 as part of a request for the configuration information for the small data transmission procedure.

The at least one memory 204 and the computer program code are further configured to, with the at least one processor 202, cause the network node device 200 to at least perform transmitting the generated configuration information to the client device 210.

In at least some embodiments, after transmitting the generated configuration information to the client device 210, the at least one memory 204 and the computer program code may alternatively be configured to, with the at least one processor 202, cause the network node device 200 to at least perform receiving from the client device 210 the update request for the configuration information based on a detected overlap in the transmitted configuration information with an overlapping activity of the client device 210. The at least one memory 204 and the computer program code may be further configured to, with the at least one processor 202, cause the network node device 200 to at least perform generating updated configuration information for the small data transmission procedure based on the received update request for the configuration information. The at least one memory 204 and the computer program code may be further configured to, with the at least one processor 202, cause the network node device 200 to at least perform transmitting the generated updated configuration information to the client device 210.

In at least some embodiments, the transmitted configuration information may comprise at least two sets of the resources for the configured uplink scheduling grant and the received update request for the configuration information comprises a selection indication about a selected non-overlapping one of the transmitted at least two sets of the resources for the configured uplink scheduling grant. The at least one memory 204 and the computer program code may be further configured to, with the at least one processor 202, cause the network node device 200 to at least perform generating of the updated configuration information for the small data transmission procedure based on the selected non-overlapping one of the transmitted at least two sets of the resources for the configured uplink scheduling grant.

Further features (such as those related to the configuration information for the small data transmission procedure, the request for the configuration information, the update request for the configuration information, and the unavailability information) of the network node device 200 directly result from the functionalities and parameters of the client device 210 and thus are not repeated here.

FIG. 3A illustrates an example signaling diagram 300A of a method, in accordance with an example embodiment.

At first, the first subscriber identity module 217 is not in a connected state of RRC, and the second subscriber identity module 218 is in a connected state of RRC, operation 301A.

At optional operation 302A, unavailability information about at least one unavailability time period may be transmitted from the client device 210 and received at the network node device 200. As discussed above, the unavailability information may be about at least one unavailability time period of the second subscriber identity module 218 that is caused by an overlapping activity of the first subscriber identity module 217, The network node device 200 generates configuration information for a small data transmission procedure of the client device 210 (based on the received unavailability information when it is used). As discussed above, the configuration information for the small data transmission procedure comprises at least one set of resources for a configured uplink scheduling grant for small data transmissions for the second subscriber identity module 218.

At operation 303A, the generated configuration information for the small data transmission procedure is transmitted from the network node device 200 and received at the client device 210.

The client device 210 carries out one or more small data transmissions 304A, 305A for the second subscriber identity module 218 based on the configuration information for the small data transmission procedure received at operation 303A.

The method of diagram 300A may be performed by the network node device 200 of FIG. 2A and the client device

210 of FIG. 2B. The operations 301A-305A can, for example, be performed by the at least one processor 202 and the at least one memory 204 and/or the at least one processor 212 and the at least one memory 214. Further features of the method of diagram 300A directly result from the functionalities and parameters of the network node device 200 and the client device 210, and thus are not repeated here. The method of diagram 300A can be performed by computer program(s). Even though the example method of diagram 300A has been described using a client device comprising two first subscriber identity modules, other configurations are possible.

FIG. 3B illustrates an example signaling diagram 300B of another method, in accordance with an example embodiment.

At first, the first subscriber identity module 217 is not in a connected state of RRC, and the second subscriber identity module 218 is in a connected state of RRC, operation 301B.

The network node device 200 generates configuration information for a small data transmission procedure of the client device 210. As discussed above, the configuration information for the small data transmission procedure comprises at least one set of resources for a configured uplink scheduling grant for small data transmissions for the second subscriber identity module 218. At operation 302B, the generated configuration information for the small data transmission procedure is transmitted from the network node device 200, and received at the client device 210. As discussed above, the generated configuration information may optionally comprise two or more sets of the resources for the configured uplink scheduling grant.

The client device 210 detects an overlap in the received configuration information with an activity of the first subscriber identity module 217 based on unavailability information about at least one unavailability time period of the second subscriber identity module 218 due to an overlapping activity of the first subscriber identity module 217. When the generated configuration information comprises two or more sets of the resources for the configured uplink scheduling grant, the client device 210 may select a non-overlapping one of the received at least two sets of the resources for the configured uplink scheduling grant in response to detecting the overlap in the received configuration information.

At operation 303B, an update request for the configuration information based on the detected overlap is transmitted from the client device 210 and received at the network node device 200. When the generated configuration information comprises two or more sets of the resources for the configured uplink scheduling grant, the update request for the configuration information may comprise a selection indication about the selected non-overlapping one of the at least two sets of the resources for the configured uplink scheduling grant.

The network node device 200 generates updated configuration information for the small data transmission procedure based on the received update request for the configuration information (and based on the included selection indication when it is used). At operation 304B, the generated updated configuration information is transmitted from the network node device and received at the client device 210.

The client device 210 carries out one or more small data transmissions 305B, 306B for the second subscriber identity module 218 based on the updated configuration information for the small data transmission procedure received at operation 304B.

The method of diagram 300B may be performed by the network node device 200 of FIG. 2A and the client device 210 of FIG. 2B. The operations 301B-306B can, for example, be performed by the at least one processor 202 and the at least one memory 204 and/or the at least one processor 212 and the at least one memory 214. Further features of the method of diagram 300B directly result from the functionalities and parameters of the network node device 200 and the client device 210, and thus are not repeated here. The method of diagram 300B can be performed by computer program(s). Even though the example method of diagram 300B has been described using a client device comprising two first subscriber identity modules, other configurations are possible.

Figure 3C:
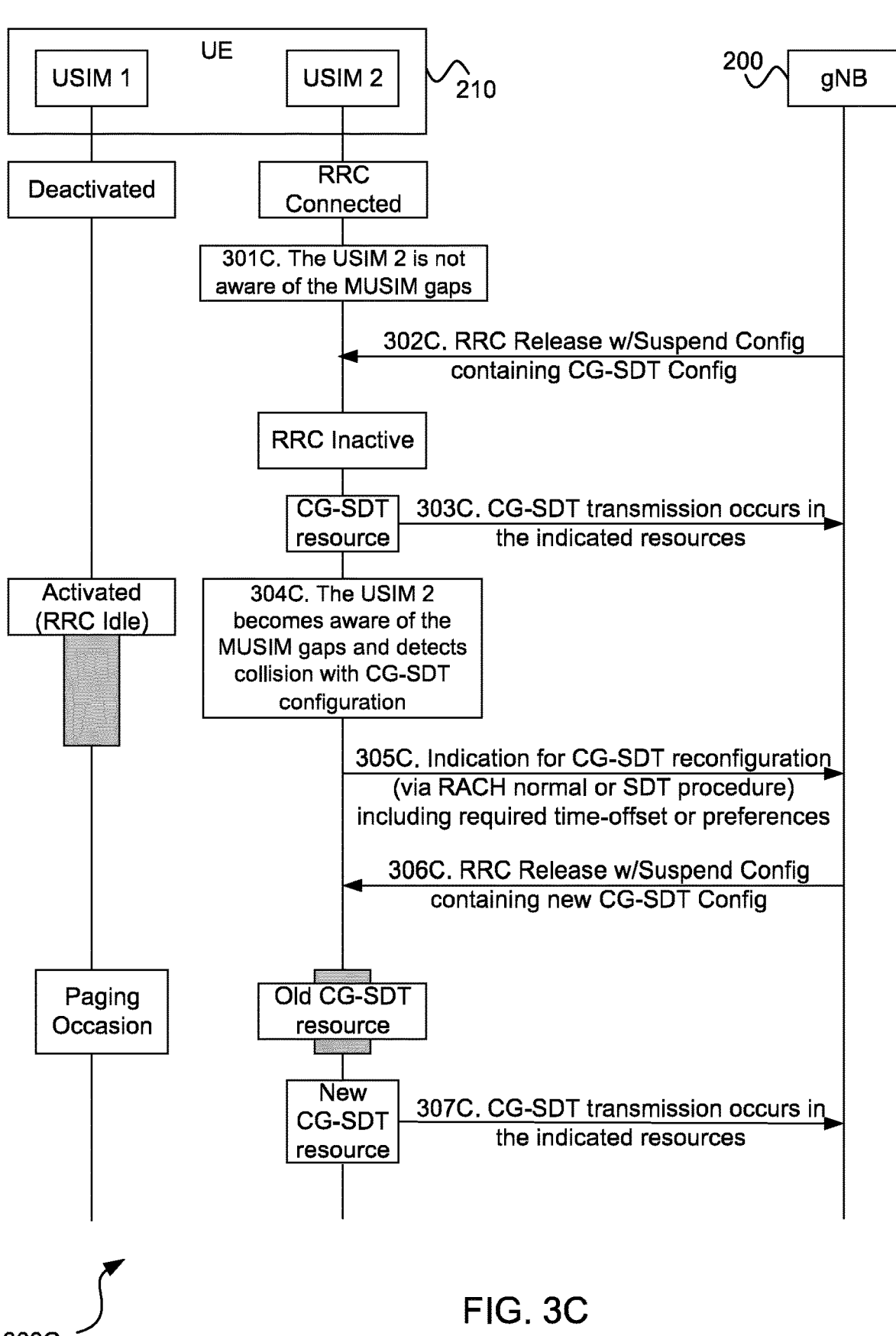
FIG. 3C shows an example embodiment of the subject matter described herein illustrating yet another method.

FIG. 3C illustrates an example signaling diagram 300C of yet another method for use in the network node device 200 and in the client device 210 comprising the first subscriber identity module 217 and the second subscriber identity module 218, in accordance with an example embodiment.

At first, the first subscriber identity module 217 is not in a connected state of RRC, and the second subscriber identity module 218 is in a connected state of RRC, operation 301C. Here, the first subscriber identity module 217 not being in the connected state of RRC comprises the first subscriber identity module 217 being deactivated when receiving the configuration information.

The network node device 200 generates configuration information for a small data transmission procedure of the client device 210. As discussed above, the configuration information for the small data transmission procedure comprises at least one set of resources for a configured uplink scheduling grant for small data transmissions for the second subscriber identity module 218. At operation 302C, the generated configuration information for the small data transmission procedure is transmitted from the network node device 200, and received at the client device 210.

After receiving the configuration information at operation 302C, the first subscriber identity module 217 is activated into an idle state of RRC or an inactive state of RRC. In response, the client device 210 detects an overlap in the received configuration information with an activity of the first subscriber identity module 217 based on unavailability information about at least one unavailability time period of the second subscriber identity module 218 that is caused by an overlapping activity of the first subscriber identity module 217, operation 304C.

At operation 305C, an update request for the configuration information based on the detected overlap is transmitted from the client device 210 and received at the network node device 200.

The network node device 200 generates updated configuration information for the small data transmission procedure based on the received update request for the configuration information. At operation 306C, the generated updated configuration information is transmitted from the network node device and received at the client device 210.

The client device 210 carries out one or more small data transmissions 307C for the second subscriber identity module 218 based on the updated configuration information for the small data transmission procedure received at operation 306C.

The method of diagram 300C may be performed by the network node device 200 of FIG. 2A and the client device 210 of FIG. 2B. The operations 301C-307C can, for example, be performed by the at least one processor 202 and the at least one memory 204 and/or the at least one processor 212 and the at least one memory 214. Further features of the method of diagram 300C directly result from the functionalities and parameters of the network node device 200 and the client device 210, and thus are not repeated here. The method of diagram 300C can be performed by computer program(s). Even though the example method of diagram 300C has been described using a client device comprising two first subscriber identity modules, other configurations are possible.

At least some of the embodiments described herein may allow optimizing SDT for a client device in an RRC inactive state while coping with disruptions in-troduced by multi-USIM operations. Furthermore, at least some of the embodiments described herein may allow the client device to indicate to a network node device when the client device is not able to access the configured CG-SDT resources. Furthermore, at least some of the embodiments described herein may allow the client device to request the network node device for the CG-SDT resource configuration to be altered so that the client device can access the resources.

The functionality described herein can be performed, at least in part, by one or more computer program product components such as software components. According to an embodiment, the network node device 200 and/or client device 210 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclu-sive list and a method or apparatus may contain addi-tional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device, comprising:

at least one processor; and at least one memory including computer program code;

the at least one memory and the computer program code configured to, with the at least one processor, cause the network node device to at least perform:

generating configuration information for a small data transmission procedure of a client device, wherein the client device comprises a user equipment having a first subscriber identity module and a second subscriber identity module, the configuration information for the small data transmission procedure comprising at least one set of resources for a configured uplink scheduling grant for small data transmissions, wherein the configuration information is generated based on unavailability information regarding the client device, the unavailability information being about at least one'unavailability time period;

transmitting the generated configuration information to the client device;

after transmitting the generated configuration information to the client device, receiving from the client device an update request for the configuration information based on a detected overlap in the transmitted configuration information with an overlapping activity of the client device;

generating updated configuration information for the small data transmission procedure based on the received update request for the configuration information; and transmitting the generated updated configuration information to the client device, wherein the transmitted configuration information comprises at least two sets of the resources for the configured uplink scheduling grant and the received update request for the configuration information comprises a selection indication about a selected non-overlapping one of the transmitted at least two sets of the resources for the configured uplink scheduling grant, and wherein the at least one memory and the computer program code are further configured to, with the at least one processor, cause the network node device to perform the generating of the updated configuration information for the small data transmission procedure based on the selected non-overlapping one of the transmitted at least two sets of the resources for the configured uplink scheduling grant, and wherein the overlapping activity comprises overlapping paging-monitoring activity related to the first subscriber identity module and the second subscriber identity module.

2. The network node device according to claim 1, wherein the at least one unavailability time period is due to an overlapping activity of the client device and wherein the at least one unavailability time period is due to an overlapping activity of the client device and wherein the configuration information comprises at least:

an identifier of the first subscriber identity module or the second subscriber identity module;

a start/offset to a reference system frame number (SFN) for a configured-grant resource;

an indication of an unavailability time period; and a selection indication identifying a preferred configured-grant resource associated with the small-data transmission procedure.

3. The network node device according to claim 1, wherein:

the at least one memory and the computer program code are further configured to, with the at least one processor, cause the network node device to at least perform the generating of the configuration information for small data transmissions for the second subscriber identity module.

4. The network node device according to claim 3, wherein the overlapping activity is due to one or more operations related to the first subscriber identity module and the second subscriber identity module.

5. The network node device according to claim 1, wherein the unavailability information is received from the client device as part of a request for the configuration information for the small data transmission procedure.

6. A method, comprising:

generating, by a network node device, configuration information for a small data transmission procedure of a client device, wherein the client device comprises a user equipment having a first subscriber identity module and a second subscriber identity module, the configuration information for the small data transmission procedure comprising at least one set of resources for a configured uplink scheduling grant for small data transmissions, wherein the configuration information is generated based on unavailability information regarding the client device, the unavailability information being about at least one unavailability time period;

transmitting the generated configuration information from the network node device to the client device, after transmitting the generated configuration information to the client device, receiving from the client device an update request for the configuration information based on a detected overlap in the transmitted configuration information with an overlapping activity of the client device;

generating updated configuration information for the small data transmission procedure based on the received update request for the configuration information; and transmitting the generated updated configuration information to the client device, wherein the transmitted configuration information comprises at least two sets of the resources for the configured uplink scheduling grant and the received update request for the configuration information comprises a selection indication about a selected non-overlapping one of the transmitted at least two sets of the resources for the configured uplink scheduling grant, and wherein the generating of the updated configuration information for the small data transmission procedure is based on the selected non-overlapping one of the transmitted at least two sets of the resources for the configured uplink scheduling grant, and wherein the overlapping activity comprises overlapping paging-monitoring activity related to the first subscriber identity module and the second subscriber identity module.

7. A client device, comprising:

at least one processor; and at least one memory including computer program code;

the at least one memory and the computer program code configured to, with the at least one processor, cause the client device to at least perform:

receiving, from a network node device, configuration information for a small data transmission procedure, the configuration information for the small data transmission procedure comprising at least one set of resources for a configured uplink scheduling grant for small data transmissions, wherein the configuration information is generated by the network node device based on unavailability information regarding the client device, the unavailability information comprising information regarding overlapping paging-monitoring activity related to a first subscriber identity module and a second subscriber identity module of the client device and being about at least one unavailability time period; and carrying out one or more small data transmissions based on at least one of the received configuration information for the small data transmission procedure or subsequently received updated configuration information for the small data transmission procedures;

detecting, by the client device, an overlap in the received configuration information with the overlapping paging-monitoring activity related to the first and second subscriber identity modules, before carrying out the one or more small-data transmissions;

transmitting to the network node device an update request for the configuration information based on the detected overlap; and receiving, from the network node device, updated configuration information for the small data transmission procedure, wherein the received configuration information comprises at least two sets of the resources for the configured uplink scheduling grant, and the at least one memory and the computer program code are further configured to, with the at least one processor, cause the client device to at least perform:

in response to detecting the overlap in the received configuration information, selecting a non-overlapping one of the received at least two sets of the resources for the configured uplink scheduling grant, wherein the transmitted update request for the configuration information comprises a selection indication about the selected non-overlapping one of the received at least two sets of the resources for the configured uplink scheduling grant.

8. The client device according to claim 7, wherein the configuration information for the small data transmission procedure is received when the first subscriber identity module is not in a connected state of radio resource control, RRC.

9. The client device according to claim 8, wherein the first subscriber identity module not being in the connected state of RRC comprises the first subscriber identity module being in an idle state of RRC or in an inactive state of RRC.

10. The client device according to claim 7, wherein the at least one memory and the computer program code are further configured to, with the at least one processor, cause the client device to at least perform:

prior to or after receiving the configuration information, transmitting to the network node device the unavailability information about the at least one unavailability time period.

11. The client device according to claim 7, wherein the at least one memory and the computer program code are further configured to, with the at least one processor, cause the client device to at least perform:

detecting an overlap in the received configuration information with an overlapping activity of the client device, before carrying out the one or more small data transmissions;

transmitting to the network node device an update request for the configuration information based on the detected overlap; and receiving, from the network node device, updated configuration information for the small data transmission procedure.

12. The client device according to claim 11, wherein detecting the overlap comprises:

monitoring paging-monitoring activity related to at least one of the first subscriber identity module and the second subscriber identity module;

detecting an overlap in the received configuration information with the paging-monitoring activity;

using unavailability information about at least one unavailability time period in connection with detecting the overlap; and identifying the overlap as involving paging-monitoring activity related to at least one of the first subscriber identity module and the second subscriber identity module.

13. The client device according to claim 7, wherein the update request comprises:

an indication of the detected overlapping paging-monitoring activity;

a selected non-overlapping configured-grant resource; and information identifying a selected start/offset to a reference system frame number (SFN) for a configured-grant resource.

14. The client device according to claim 13, wherein the first subscriber identity module not being in the connected state of RRC further comprises the first subscriber identity module being deactivated when first receiving the configuration information.

15. A method, comprising:

receiving, at a client device from a network node device, configuration information for a small data transmission procedure, the configuration information for the small data transmission procedure comprising at least one set of resources for a configured uplink scheduling grant for small data transmissions, wherein the configuration information is generated by the network node device based on unavailability information regarding the client device, the unavailability information comprising information regarding overlapping paging-monitoring activity related to a first subscriber identity module and a second subscriber identity module of the client device and being about at least one unavailability time period; and carrying out, by the client device, one or more small data transmissions based on at least one of the received configuration information for the small data transmission procedure or subsequently received updated configuration information for the small data transmission procedure, detecting, by the client device, an overlap in the received configuration information with the overlapping paging-monitoring activity related to the first and second subscriber identity modules, before carrying out the one or more small-data transmissions;

transmitting to the network node device an update request for the configuration information based on the detected overlap; and receiving, from the network node device, updated configuration information for the small data transmission procedure, wherein the received configuration information comprises at least two sets of the resources for the configured uplink scheduling grant, in response to detecting the overlap in the received configuration information, selecting a non-overlapping one of the received at least two sets of the resources for the configured uplink scheduling grant, wherein the transmitted update request for the configuration information comprises a selection indication about the selected non-overlapping one of the received at least two sets of the resources for the configured uplink scheduling grant.

16. The method according to claim 15, further comprising, by the client device:

detecting an overlap in the received configuration information with paging-monitoring activity related to the first and second subscriber identity modules;

transmitting an update request for the configuration information based on the detected overlap to a network node device;

receiving updated configuration information from the network node device;

selecting a non-overlapping configured-grant resource from at least two sets included in the updated configuration information, wherein the update request comprises a selection indication about the selected non-overlapping configured-grant resource.

* * * * *